March 1, 1960 C. D. MURDOCH 2,926,861

MAGNETIC SOUND RECORDING APPARATUS

Filed April 21, 1955 3 Sheets-Sheet 1

INVENTOR.
COLIN D. MURDOCH

BY K. R. Hanchun

PATENT AGENT

March 1, 1960 C. D. MURDOCH 2,926,861

MAGNETIC SOUND RECORDING APPARATUS

Filed April 21, 1955 3 Sheets-Sheet 2

INVENTOR.
COLIN D. MURDOCH

BY

PATENT AGENT

MAGNETIC SOUND RECORDING APPARATUS

Filed April 21, 1955 3 Sheets-Sheet 3

INVENTOR.
COLIN D. MURDOCH
BY
K. A. Fancher
PATENT AGENT

United States Patent Office 2,926,861
Patented Mar. 1, 1960

2,926,861

MAGNETIC SOUND RECORDING APPARATUS

Colin D. Murdoch, San Leandro, Calif., assignor to John F. Cady, San Francisco, Calif.

Application April 21, 1955, Serial No. 502,956

3 Claims. (Cl. 242—55.13)

The present invention relates to magnetic sound recording apparatus. More particularly the present invention relates to magnetic sound recording apparatus of the type employing a tape provided with a magnetizable coating to magnetically record the sound thereon.

It is an object of the present invention to provide a magnetic sound recording apparatus, of the type referred to, that is inexpensive and of simple construction yet dependable in operation.

Another object of the invention is to provide a magnetic sound recording apparatus that is simple to operate.

Still another object of the invention is to provide a magnetic sound recording apparatus, of the type referred to, upon which the tape supply and take-up reels may readily be mounted in proper position by an unskilled user.

It is a particular object of the invention to arrange the tape supply and take-up reels of apparatus, of the type referred to, in such a manner that they can be handled as an independent magazine unit that may readily be applied to the recording apparatus.

In this connection it is a specific object of the invention to provide a tape magazine, for apparatus of the type referred to, that may readily be mounted in its proper position upon the recording apparatus and, when so mounted, will provide for proper guidance of the tape past the recording and/or play-back head of the apparatus.

Another specific object of the invention is to provide a self-contained tape magazine, of the type referred to, which is adapted to hold the tape with the proper amount of pressure against the recording and/or play-back head of the recording apparatus, when mounted in proper position on said apparatus.

Yet another specific object of the invention is to provide a self-contained tape magazine that provides automatically for the proper tension of the tape during the recording and reproduction operations.

Furthermore, it is an object of the invention to provide a self-contained tape magazine, for magnetic sound recording apparatus, that includes the drive mechanism for the tape.

Additionally, it is an object of the invention to provide a recording apparatus adapted to mount, and be operated with, self-contained tape supply and take-up units of the type referred to.

Moreover, it is an object of the invention to provide a recording machine, of the type referred to, with means effective, during practical performance of the apparatus, to prevent breakage of the tape in a self-contained tape supply and take-up unit mounted thereon.

Still another object of the invention is to provide a self-contained tape supply and take-up unit that is reversible, i.e., wherein the reels for supplying and taking up the tape during operation of the recording apparatus may interchange their functions depending on the manner in which the unit is applied to the recording machine.

These and other objects of the present invention will be apparent from the following description of the accompanying drawings which illustrate a preferred embodiment thereof and wherein.

Figure 1:
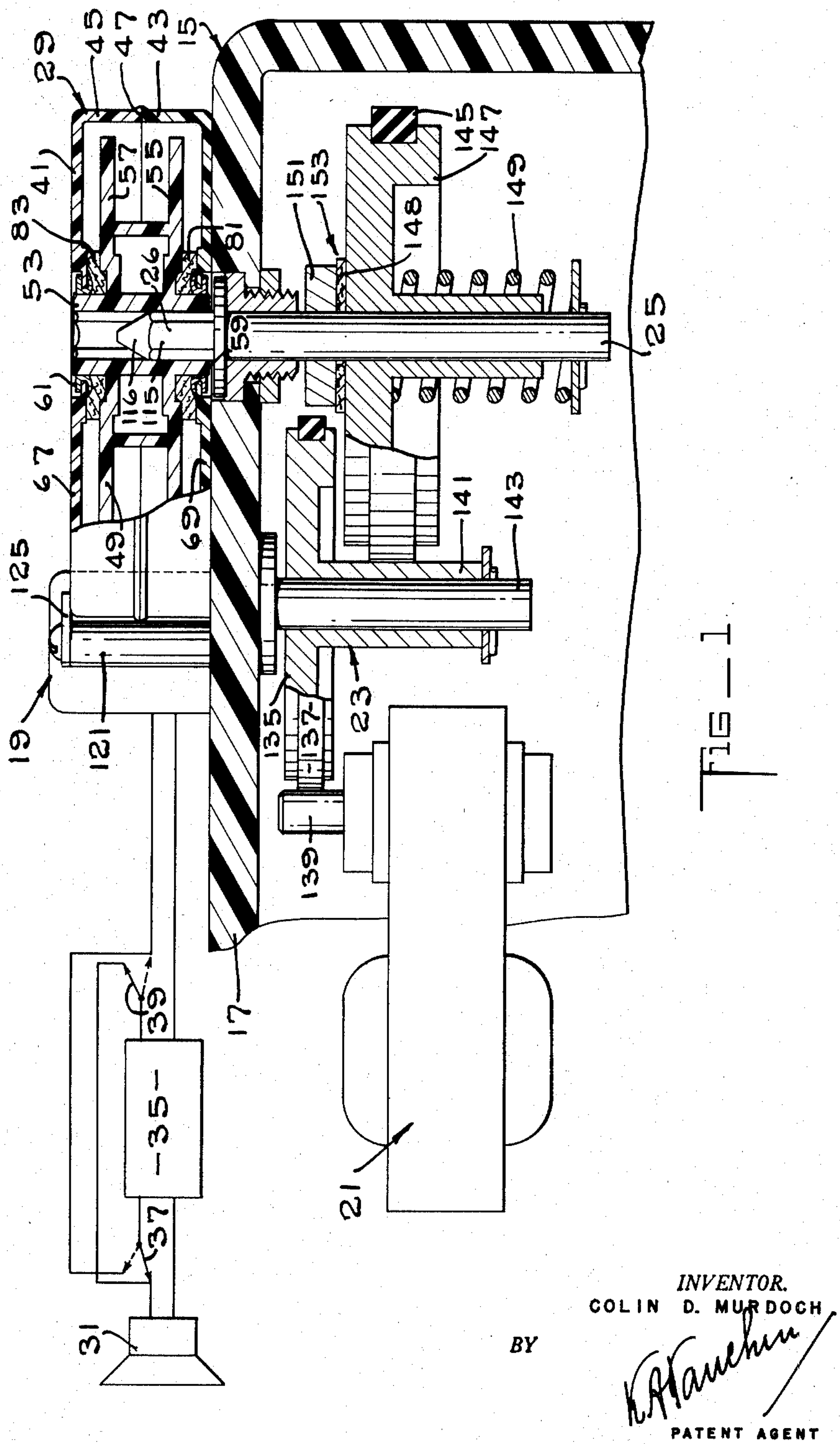
Fig. 1 is a fragmentary side elevation, partly in section, of a magnetic recording apparatus embodying the invention and illustrates diagrammatically the major components thereof.

Having first reference to Fig. 1, the recording apparatus of the invention comprises a casing 15 having a top panel 17 upon which is mounted the recording and play-back head 19. Suitably arranged within the casing 15 underneath the panel 17 is an electric motor 21 that drives, through a transmission 23, a vertically disposed shaft 25 which projects upwardly through the panel 17. Upon the upwardly projecting end 26 of said shaft 25 and upon a stationary stud 27 mounted in and projecting upwardly from the panel 17 (Figs. 2 and 6) is engaged the tape magazine 29 of the invention. The recording and play-back head 19 is connected to a microphone 31, located in the front wall of the casing 15, through an amplifier indicated by a block 35, in such a manner that it may be employed for both recording and play-back depending upon the position of suitable switches 37 and 39, as diagrammatically indicated in Fig. 1.

Figure 2:
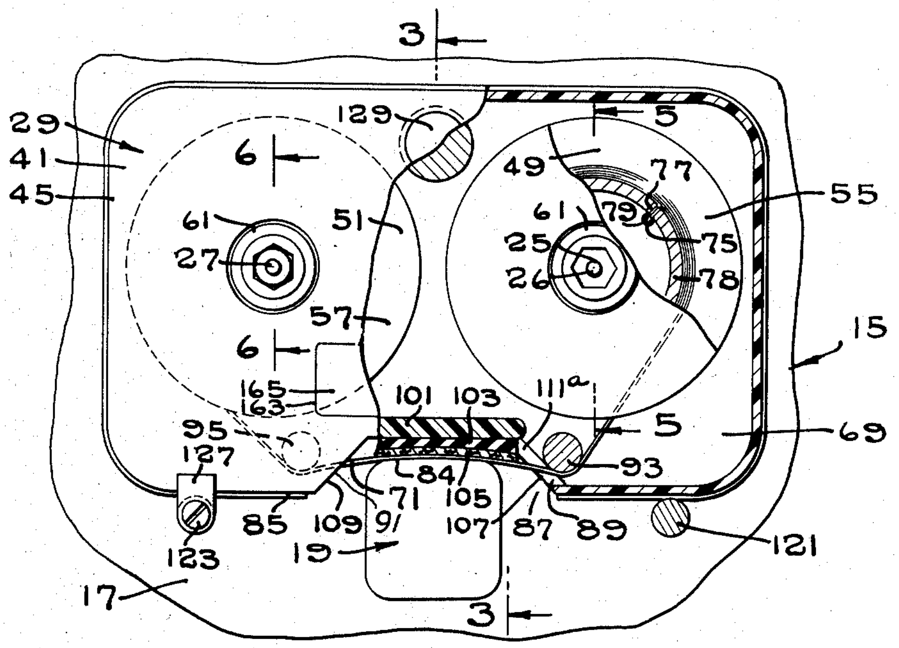
Fig. 2 is a fragmentary plan view of the recording apparatus with a tape magazine mounted thereon, certain parts being broken away to expose structure underneath.
Figure 3:
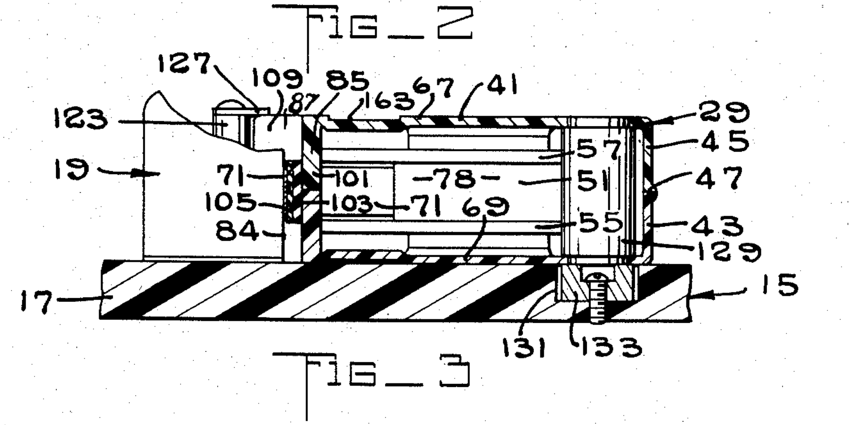
Fig. 3 is a transverse vertical section through the tape magazine of the invention and part of the recording apparatus, taken along line 3—3 of Fig. 2.
Figure 4:
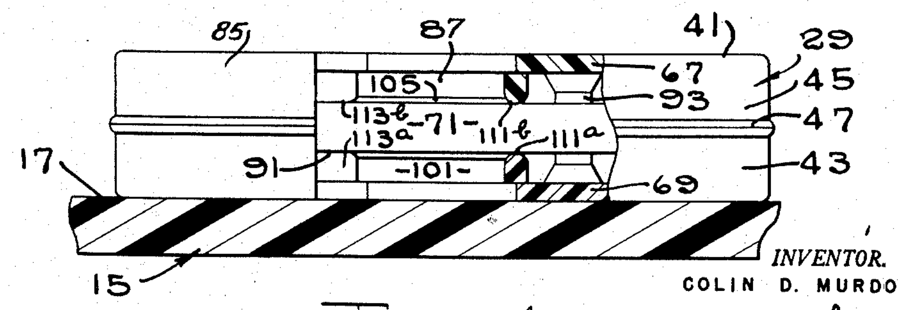
Fig. 4 is a fragmentary front elevation of the tape magazine.
Figure 5:
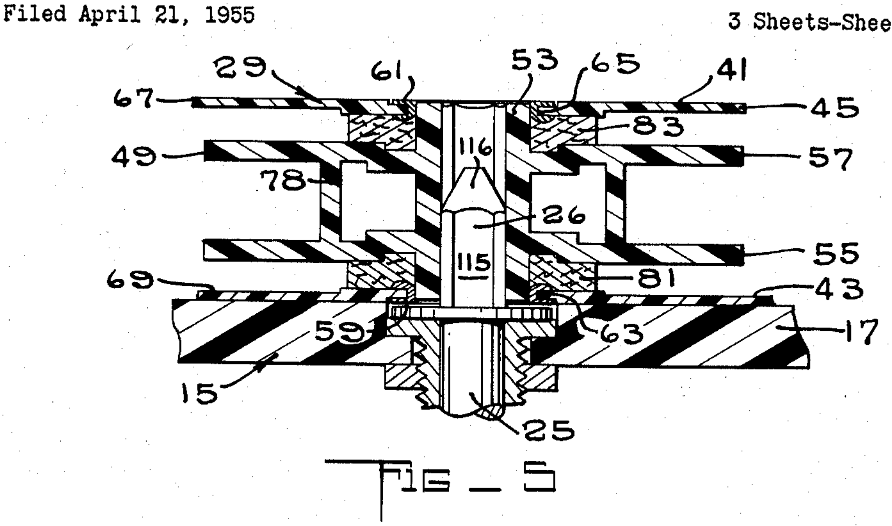
Fig. 5 is a fragmentary transverse vertical section taken along line 5—5 of Fig. 2.
Figure 6:
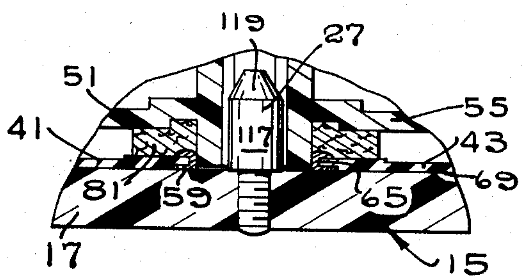
Fig. 6 is a fragmentary transverse vertical section taken along line 6—6 of Fig. 2.

Having reference to Figs. 2, 3 and 4 the tape magazine 29 of the invention comprises a case 41 of suitable plastic that is preferably composed of two identical tray-shaped parts 43 and 45 which are welded together along their edges 47. Disposed within the case 41, are two identical reels 49 and 51. Each reel has a vertically disposed tubular hub 53 that carries two radially projecting axially spaced side flanges 55 and 57 and whose opposite ends are rotatably received in suitable metal grommets 59 and 61, respectively, that are engaged over the edges of circular openings 63 and 65 provided in vertical alignment within the top and bottom walls 67 and 69, respectively, of case 42 (Figs. 5 and 6).

The recording tape 71 is wound upon the reels 49 and 51 and its opposite ends are suitably anchored within said reels 49 and 51. For this purpose each end of the tape may be formed into a loop 75 (Fig. 2) that is pushed through a suitable slot 77 in the floor 78 of the reel 49 or 51, as the case may be, whereupon a pin 79 is inserted into the loop 75 as shown in Fig. 2, to prevent disengagement of the loop from the floor of the reel. To inhibit free rotation of the reels within the grommet bearings 59 and 61, felt washers 81 and 83 are interposed between the flanges 55 and 57 of the reels and the top and bottom walls 67 and 69, respectively, of the case 41. By their friction these felt washers make it necessary to apply a rotative force to one of the reels before they will unwind a length of tape thereon and they have the added advantage of properly centering the reels 49 and 51 within the case.

To expose the length of tape extending from reel 49 to reel 51, to the head 19 of the recording apparatus, when the magazine is in its proper position upon said apparatus, the case 41 is recessed along its front wall 85 as shown at 87 in Figs. 2, 3 and 4, and forms apertures 89 and 91 in the sides of recess 87, through which the tape is conducted out of and back into the case 41 by means of vertically disposed guide studs 93 and 95 that are suitably mounted in the top and bottom walls of the case 41 adjacent the apertures 89 and 91 (Figs. 2, 4 and 7) and which may be made from a suitable aluminum alloy.

While the tension of the length of tape extending between reels 49 and 51, as provided by the friction washers 81 and 83, will usually be sufficient to hold the tape in close contact with the face 84 of the recording head 19, which projects into the recess 87 when the magazine is in its proper position upon the recording apparatus, the magazine of the invention comprises additional means for yieldably holding the tape with the proper pressure against the face of the recording head. For this purpose a cushion 103 of sponge rubber provided with an outer felt covering 105 is attached to the front wall portion 101 intermediately of the apertures 89 and 91 behind the exposed length of tape (Figs. 2 and 3). When the reel unit of the invention is properly installed on the recording apparatus, the rubber pad urges the exposed length of tape yieldably into effective contact with the face of the recording head 19. It will be understood that suitable spring means may take the place of the rubber cushion 103 to establish appropriate contact between the tape and the face of the recording head.

Figure 7:
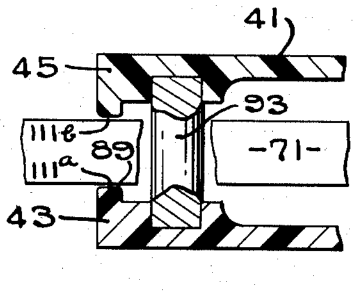
Fig. 7 is a fragmentary vertical section taken along line 7—7 of Fig. 2 and viewed in the direction of the arrows associated with said line.

While the felt washers 81 and 83 above and below the flanges 55 and 57 of reels 49 and 51 center said reels effectively in a direction vertically of case 41 and in this manner aid in guiding the tape at the proper level past the face of the recording head 19 when the unit is appropriately installed upon the recording apparatus, the receding sides 107 and 109 of the recess 87 in the front wall 85 of the case, within which are provided the apertures 89 and 91, respectively, are arranged to form upper and lower guide lips **111*a*, 111*b* and 113*a*, 113*b*, as shown in Figs. 4 and 7, which engage the edges of the tape as it emerges from and returns into the case 41**, and in this manner center the tape accurately in a vertical direction, as it travels past the recording head.

To establish a driving connection between the upper projecting end 26 of the drive shaft 25 and whichever reel of the described unit 29 may serve as the take-up reel at a particular time, said upper end 26 of shaft 25 is of polygonal and preferably hexagonal contour as shown at 115 in Fig. 5, and the interior of the tubular reel hubs 53 is of corresponding cross-section, as likewise shown in Fig. 5, and is arranged to fit snugly over the upper end 26 of the drive shaft 25. To facilitate entrance of the upper end of the drive shaft 25 into the tubular reel hubs, its hexagonal portion 115 may be topped by a cone 116. To permit rotation of the reel that serves as tape supply reel, the hereinbefore mentioned stationary stud 27, which is secured to and projects upwardly from the top panel 17 of the recording apparatus, is formed in the manner of a smooth cylinder 117 that fits into the hexagonal interior of the reel hubs and which is topped by a cone 119 to facilitate entrance of the stud into said hubs (Fig. 6).

To guide the described tape magazine into its proper position relative to the recording head 19, as determined by engagement of the tubular hubs 53 of the reels 49 and 51 with the upper end 26 of the drive shaft 25 and the idler stud 27, respectively, the top panel 17 of the recording apparatus carries at either side of the recording head 19 posts 121 and 123 upon whose upper ends are mounted retaining clips 125 and 127. When a reel unit is placed into position upon the recording apparatus, it is tilted with its front wall 85 facing downwardly and its upper front edge is slipped underneath the clips 125 and 127 at either side of the recording head 19, and it is then pushed forwardly, i.e., in a direction toward the recording head and underneath the clips until the tubular hubs 53 of its reels 49 and 51 drop over the upper end of the drive shaft 25 and the idler stud 27, respectively, when the rubber cushion 103 on its partition 101 is compressed and urges the exposed length of tape yieldably against the face 84 of the recording head 19, as shown in Fig. 2.

To retain the unit in its proper position in spite of shocks to which the recording apparatus and/or the magazine may be exposed during practical use, a cylindrical column 129 of a magnetizable material, such as soft iron, may be mounted in its case 41 at a center point adjacent the rear wall thereof (Figs. 2 and 3), and at a corresponding point the top panel 17 of the recording apparatus may be provided with a recess 131 within which is adjustably supported a permanent magnet in the form of a disc 133. When a magazine 29 is properly installed upon the recording apparatus in the manner described above, the exposed lower end of iron column 129 registers with and comes to lie above the magnetic disc 133 in the top panel 17 of the recording apparatus and the magnetic force of said disc holds the magazine dependably in its proper position as shown in Figs. 2 and 3. To remove the magazine from this position, it will require some effort on the operator's part to overcome the attraction between magnet 133 and iron column 131.

Reverting to the recording apparatus, the transmission 23 contained therein comprises a disc 135 within whose edge is retained a rubber tire 137 that contacts, and establishes driving connection with, the drive shaft 139 of motor 21 as shown in Fig. 1. The disc 135 forms a tubular stem 141 that is rotatably held over a stub shaft 143 which is secured to and extends downwardly from the top panel 17 of casing 15. The tubular stem 141 of disc 135 is engaged by another rubber tire 145 that is held in the peripheral edge of another disc 147. The latter disc 147 is rotatably engaged over the hereinbefore mentioned drive shaft 25 of the recording apparatus, and a spring 149 coiled around said shaft urges the disc 147 with its upper surface through a felt washer 148 into frictional driving engagement with yet another disc 151 that is firmly secured to the shaft 25. The frictional engagement of disc 147 with disc 151 under the urgency of spring 149 constitutes a friction clutch 153 that transmits the rotary power of motor 21 under ordinary conditions to whichever reel of magazine 29 may be engaged over the polygonal upper end 26 of shaft 25, but will suspend transmission of power whenever the force exerted upon the tape that is being wound up upon said reel exceeds a predetermined limit. Thus, by proper choice of the strength of spring 149 which holds the discs 147 and 151 in driving engagement, the clutch 153 may be arranged to slip before the tape in the magazine comes to harm, when the supply of tape on the reel that serves as the supply reel at the moment has been completely exhausted.

Figure 8:
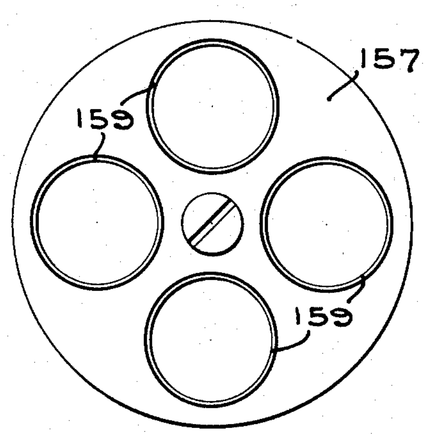
Fig. 8 is a plan view of an accessory implement that is used in connection with the tape magazine of the invention.
Figure 9:
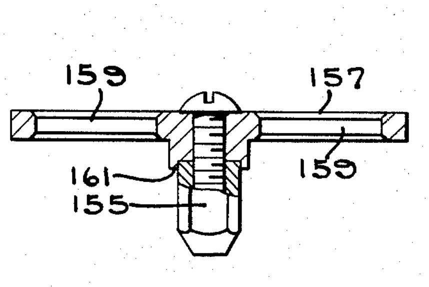
Fig. 9 is a vertical section through the implement illustrated in Fig. 8 taken along line 9—9 thereof.

To rewind the tape on whichever reel is used as the tape supply wheel, either for the purpose of back-play of the recorded message or for the purpose of correction, a hexagonal key 155 of brass or the like (Fig. 9) is inserted into the tubular hub 53 of the supply reel and is turned in a direction opposite to the direction of rotation of the supply reel during the recording operation. To facilitate turning of the key 155 in the required direction said key is bolted to a circular disc 157 of plastic material or the like which is provided with a plurality of angularly equispaced holes 159 (Fig. 8) each adapted to receive the operator's finger, and whenever the operator wishes to rewind the tape, he inserts the key 155 into the hub 53 of the supply reel and then inserts one of his fingers into one of the holes 159 of disc 157 and turns the disc in the appropriate direction in a manner similar to dialing an automatic telephone. To maintain the disc at a proper distance above the adjacent wall 67 or 69 of the magazine case 41, the key 155 may be arranged to form a shoulder 161 that bears against the adjacent wall of the case as shown in Fig. 9.

By the tape magazine of the invention the tiresome task of threading a new tape through the various mechanisms for centering the tape and guiding it in close contact with and past the recording head of the recording apparatus, and of anchoring it in the drive reel are rendered unnecessary. By mounting the magazine in the hereinbefore described manner upon the recording apparatus, the tape is immediately ready for operation, be it recording or play-back, it is guided accurately past the recording and play-back head, and is urged with just the approriate amount of pressure against the recording head. When a message has been recorded upon the tape, be it the spoken word or music, the magazine may be stored in libraries ready for intantaneous use whenever it is desired to play the recording back. The tape magazine of the invention is, therefore, eminently suited for use in machines for playing back desired selections, such as the machines known as "juke boxes." As an added advantage the tape magazine of the present invention can readily be packed and mailed.

To identify the recordings on the tape of the magazine of the invention, the cases 41 thereof may be provided with suitable recesses 163 (Fig. 2) within which may be received panel 165 that bear the titles of the music, speeches, dramatic performance or the like that have been recorded on the tape.

To indicate to a user the amount of tape left at any particular moment, the case 41 is preferably made of a transparent material, such as the plastic known under the trade name "Lucite." Alternatively, if the case is made from opaque material, it may be provided with slots that expose the amount of tape wound upon its reels, and calibrations may be marked adjacent these slots that inform the operator at a glance how much longer he may use a particular magazine for recording.

A particular advantage of the magazine of the present invention is its symmetrical construction both as to a horizontal plane medially intersecting the case 41 and as to a vertical plane medially intersecting the case between the reels 49 and 51. Thus, it is immaterial which of its reels serves as drive or take-up reel and which serves as tape supply reel, and in conventional tape recording methods wherein the upper and lower longitudinal halves of a tape may carry separate recordings, the first recording on one half of the tape is ready for reproduction when the recording of the second half has been completed, and vice versa the second recording is ready for reproduction after the first recording has been played back.

Yet another particular advantage of the present invention is the fact that there is no special mechanism, aside from the reels themselves, for moving the tape past the recording head since it is one of the reels 49 or 51 that advances the tape depending on what reel is engaged with the upper end of the drive shaft 25. Since the drive shaft turns with a constant angular speed, this will cause the tape to move past the recording head 19 with varying speeds depending upon the amount of tape wound upon the driving reel 49 or 51, as the case may be, but these varying speeds of the tape as it passes the recording head, have no harmful effect upon the fidelity of the reproduction since the speed of the tape will vary correspondingly during any play-back operation in a manner similar to the varying absolute speeds with which the recording grooves of a phonograph disc are moved past the pick-up needle depending upon the diameter of each particular groove.

While I have explained my invention with the aid of a particular embodiment thereof, it will be understood that I do not wish to be limited to the specific constructional details shown and described which may be departed from without departing from the scope and spirit of my invention.

What I claim is:

1. A tape magazine for a magnetic tape recording apparatus comprising a case having top and bottom walls and a centrally recessed front wall, said top and bottom walls having vertically aligned circular openings at either side of a vertical plane of symmetry bisecting the recess in said front wall and said front wall having a pair of symmetrically arranged apertures within said recess, reels disposed within said case at either side of said plane of symmetry, said reels having vertically disposed tubular hubs rotatably received with their opposite ends in the vertically aligned openings in the top and bottom walls of said case, friction washers arranged between the outer surfaces of the flanges of said reels and the inner surfaces of the top and bottom walls respectively of said case to inhibit free rotation of said reels within said case, a magnetizable tape wound upon at least one of said reels and having its opposite ends anchored in said reels, said tape being arranged to emerge through said apertures in the front wall of the case, and means adjacent the recessed area of said front wall for yieldably urging the exposed tape run in a direction away from said front wall.

2. A tape magazine for a magnetic tape recording apparatus comprising a flat case having parallel top and bottom walls and a centrally recessed front wall, said top and bottom walls having vertically aligned circular openings at either side of a vertical plane of symmetry bisecting the recess in said front wall, and said front wall having a pair of symmetrically arranged apertures located in the sides of the recess formed by said front wall, reels disposed within said case at either side of said plane of symmetry, said reels having vertically disposed tubular hubs of polygonal internal contour rotatably received in their opposite ends in the vertically aligned openings in the top and bottom walls of said case, friction washers arranged between the outer surfaces of the flanges of said reels and the inner surfaces of the top and bottom walls respectively of said case to inhibit free rotation of said reels within said case, a magnetizable tape wound upon at least one of said reels and having its opposite ends anchored in said reels, said tape being arranged to emerge through said apertures in the front wall of the case, guide studs mounted in the top and bottom walls of said case adjacent said apertures for guiding the tape smoothly into and through said apertures, centering lips formed on said top and bottom walls above and below said apertures for maintaining the exposed tape run accurately at a predetermined level vertically of the case, and a rubber cushion arranged between a central area of said front wall intermediately of said apertures and the exposed tape run for yieldably urging said exposed tape run in a direction away from said front wall.

3. A tape magazine for a magnetic tape recording apparatus comprising a flat case having parallel top and bottom walls, a centrally recessed front wall and a rear wall, said top and bottom walls having vertically aligned circular openings at either side of a vertical plane of symmetry bisecting the recess in said front wall, and said front wall having a pair of symmetrically arranged apertures located in the sides of the recess formed by said front wall, reels disposed within said case at either side of said plane of symmetry, said reels having vertically disposed tubular hubs of polygonal internal contour rotatably received with their opposite ends in the vertically aligned openings in the top and bottom walls of said case, friction washers arranged between the outer surfaces of the flanges of said reels and the inner surfaces of the top and bottom walls respectively of said case to inhibit free rotation of said reels within said case, a magnetizable tape wound upon at least one of said reels and having its opposite ends anchored in said reels, said tape being arranged to emerge through said apertures in the front wall of the case, guide studs mounted in the top and bottom walls of said case adjacent said apertures for guiding the tape smoothly into and through said apertures, centering lips formed on said top and bottom walls above and below said apertures for maintaining the exposed tape run accurately at a predetermined level vertically of the case, a rubber cushion arranged between a central area of said front wall intermediately of said apertures and the exposed tape run for yieldably urging said exposed tape run in a direction away from said front wall, and a core of magnetizable material mounted in and extending between said top and bottom walls at a point adjacent and centrally of the rear wall of said case.

References Cited in the file of this patent

UNITED STATES PATENTS

| | | |
|---|---|---|
| 1,591,697 | Bornmann | July 6, 1926 |
| 2,505,783 | Mellert | May 2, 1950 |
| 2,529,501 | Johnston | Nov. 14, 1950 |
| 2,550,556 | Haloski | Apr. 24, 1951 |
| 2,558,432 | Haloski | June 26, 1951 |
| 2,563,398 | Courtney | Aug. 7, 1951 |
| 2,612,565 | Heller | Sept. 30, 1952 |
| 2,613,040 | Lewis | Oct. 7, 1952 |
| 2,625,335 | Atwood | Jan. 13, 1953 |
| 2,663,513 | Herrmann et al. | Dec. 22, 1953 |
| 2,676,766 | Ross | Apr. 27, 1954 |
| 2,681,950 | Owens | June 22, 1954 |
| 2,702,834 | Golle et al. | Feb. 22, 1955 |
| 2,712,448 | Schroter | July 5, 1955 |
| 2,782,999 | Rohling et al. | Feb. 26, 1957 |
| 2,804,508 | Mastling et al. | Aug. 27, 1957 |